(12) United States Patent
Hashizume et al.

(10) Patent No.: US 11,486,329 B2
(45) Date of Patent: Nov. 1, 2022

(54) LOAD OPERATING DEVICE

(71) Applicant: HONDA MOTOR CO., LTD., Tokyo (JP)

(72) Inventors: Takashi Hashizume, Saitama (JP); Hisanori Kanayama, Saitama (JP); Akifumi Fujima, Saitama (JP); Keiichiro Bungo, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 53 days.

(21) Appl. No.: 16/642,805

(22) PCT Filed: Sep. 1, 2017

(86) PCT No.: PCT/JP2017/031663
§ 371 (c)(1),
(2) Date: Feb. 27, 2020

(87) PCT Pub. No.: WO2019/043924
PCT Pub. Date: Mar. 7, 2019

(65) Prior Publication Data
US 2020/0200121 A1    Jun. 25, 2020

(51) Int. Cl.
*F02D 45/00*    (2006.01)
*H02J 1/00*    (2006.01)
*H02J 7/34*    (2006.01)

(52) U.S. Cl.
CPC .............. *F02D 45/00* (2013.01); *H02J 1/00* (2013.01); *H02J 7/34* (2013.01)

(58) Field of Classification Search
CPC .............. F02D 45/00; H02J 1/00; H02J 7/34
See application file for complete search history.

(56) References Cited

U.S. PATENT DOCUMENTS

2002/0047419 A1*  4/2002  Shimizu .................... H02P 9/30
                                                        310/120
2006/0186738 A1*  8/2006  Noguchi .................. B60K 6/28
                                                        307/10.1
(Continued)

FOREIGN PATENT DOCUMENTS

JP    2008-052915 A    3/2008
JP    2008-177138 A    7/2008
(Continued)

OTHER PUBLICATIONS

Oct. 24, 2017, International Search Report issued for related PCT Application No. PCT/JP2017/031663.
(Continued)

*Primary Examiner* — Grant Moubry
*Assistant Examiner* — Ruben Picon-Feliciano
(74) *Attorney, Agent, or Firm* — Paratus Law Group, PLLC

(57) ABSTRACT

A load operating device includes a power supply device which is detachable from a load and can supply power to the load in a state of being attached to the load and an electrical connection device which is provided integrally with the load and electrically connects the power supply device and the load in a state where the power supply device is attached to the load. The power supply device has a capacitor which stores power to be supplied to the load and a processing unit in which a power supply circuit from the capacitor to the processing unit via the electrical connection device is established in a state where the power supply device is electrically connected to the electrical connection device.

4 Claims, 3 Drawing Sheets

(56) References Cited

U.S. PATENT DOCUMENTS

| | | | |
|---|---|---|---|
| 2009/0108806 A1 | 4/2009 | Takano et al. | |
| 2012/0262035 A1 | 10/2012 | Takano et al. | |
| 2013/0296126 A1* | 11/2013 | Gibson | B60L 50/40 477/5 |
| 2016/0347326 A1* | 12/2016 | Iwagami | B60W 50/023 |
| 2021/0140388 A1* | 5/2021 | Kusakabe | F02B 31/04 |

FOREIGN PATENT DOCUMENTS

| | | |
|---|---|---|
| JP | 2014-058906 A | 4/2014 |
| JP | 2014-132805 A | 7/2014 |
| JP | 2014-234752 A | 12/2014 |

OTHER PUBLICATIONS

Oct. 24, 2017, International Search Opinion issued for related PCT Application No. PCT/JP2017/031663.

\* cited by examiner

LOAD OPERATING DEVICE

CROSS REFERENCE TO PRIOR APPLICATION

This application is a National Stage Patent Application of PCT International Patent Application No. PCT/JP2017/031663 (filed on Sep. 1, 2017) under 35 U.S.C. § 371, which is hereby incorporated by reference in its entirety.

TECHNICAL FIELD

The present invention relates to a load operating device including a power supply device which is detachable from a load and an electrical connection device which electrically connects the power supply device and the load.

BACKGROUND ART

Patent Literature 1 discloses an engine working machine in which a control circuit for driving a fuel supply device using a solenoid and a battery are efficiently mounted. The engine working machine requires a power supply for driving the fuel supply device and a dry battery is used to supply the power supply. A battery chamber for accommodating the dry battery is provided in a fan case and the dry battery can be easily accessed from the outside and is arranged at a position where it does not hinder the work.

However, when the voltage of the dry battery is reduced, sufficient power for driving the fuel supply device cannot be obtained. Therefore, a form which uses a power supply which is detachable from the engine working machine instead of the dry battery has been also desired. In an engine working machine described in Patent Literature 2, by using a detachable battery pack widely used in electric tools and the like, the voltage of the battery pack is reduced and a cell motor is driven to start up an engine.

CITATION LIST

Patent Literature

[Patent Literature 1]: JP-A-2014-234752
[Patent Literature 2]: JP-A-2014-058906

SUMMARY OF INVENTION

Technical Problem

Any of the engine working machines described in Patent Literature 1 and Patent Literature 2 can start up the engine when a dry battery or a battery pack is prepared. Therefore, when an engine working machine in which only a specific person such as the owner can start the engine is provided, a key device separate from the engine is prepared and the key device is provided with a capacitor and a recognition unit. In the engine working machine of this form, when the key device is attached to the engine, recognition is performed and power is supplied to the engine from the capacitor of the key device.

However, since the key device is provided separately from the engine, it forms a single closed circuit including the capacitor and the recognition unit. Therefore, when the engine is not operating, that is, when the key device is not attached to the engine and is in a single state, dark current flows and the charged amount of the capacitor gradually decreases.

An object of the invention is to provide a load operating device capable of suppressing a decrease in a charged amount of a capacitor when the power supply device having the capacitor storing the power supplied to the load is in a single state.

Solution to Problem

The invention provides the following aspects.

According to a first aspect, there is provided a load operating device which includes a power supply device (for example, a power supply device 200 of an embodiment described below) which is detachable from a load and can supply power to the load in a state of being attached to the load and an electrical connection device (for example, a receptacle 100 in the embodiment described below) which is provided integrally with the load and electrically connects the power supply device and the load in a state where the power supply device is attached to the load, where the power supply device includes a capacitor (for example, a secondary battery 201 of the embodiment described below) which stores power to be supplied to the load, and a processing unit (for example, a CPU 203 of the embodiment described below) in which a power supply circuit from the capacitor to the processing unit via the electrical connection device is established in a state where the power supply device is electrically connected to the electrical connection device.

According to a second aspect, there is provided
the load operating device according to the first aspect, where
the load includes an internal combustion engine (for example, a general-purpose engine E of the embodiment described below) having an electronically controlled fuel injection device and a power generation unit (for example, a power generation coil 56 of the embodiment described below) which generates power by operation of the internal combustion engine,
the electrical connection device includes a relay circuit (for example, a relay circuit 101 of the embodiment described below) which opens or closes a power supply path from the capacitor of the power supply device attached to the load, to the load, and
the relay circuit opens the power supply path when an output voltage of the power generation unit exceeds a voltage applied from the power supply device to the load.

According to a third aspect, there is provided
the load operating device according to the second aspect, where
the processing unit of the power supply device is supplied with power from the load via the electrical connection device when the output voltage of the power generation unit exceeds the voltage applied from the power supply device to the load.

According to a fourth aspect, there is provided
the load operating device according to any one of the first aspect to the third aspect, where
the load operates at a voltage higher than an output voltage of the capacitor, and
the electrical connection device includes a booster circuit (for example, a booster circuit 103 of the embodiment described below) for boosting the output voltage of the capacitor.

According to a fifth aspect, there is provided
a power supply device (for example, the power supply device 200 of the embodiment described below) which is detachable from a load and can supply power to the load in a state of being attached to the load, including:

a capacitor (for example, the secondary battery 201 of the embodiment described below) which stores power to be supplied to the load; and a processing unit (for example, the CPU 203 of the embodiment described below) in which an electrical path from the capacitor is not conductive, where a power supply circuit from the capacitor to the processing unit via the electrical connection device is established in a state of being electrically connected to an electrical connection device provided integrally with the load.

ADVANTAGEOUS EFFECTS OF INVENTION

According to the first aspect and the fifth aspect, when the power supply device is electrically connected to the electrical connection device, a power supply circuit from the capacitor to the processing unit is established via the electrical connection device. However, when the power supply device is in a single state not attached to the load, the electrical path from the capacitor to the processing unit does not conduct. Therefore, it is possible to suppress a decrease in the charged amount of the capacitor due to generation of dark current.

According to the second aspect, when the output voltage of the power generation unit exceeds the voltage applied to the load from the power supply device and the load can operate autonomously with the power generated by the power generation unit, the power supply path from the capacitor to the load is opened. Therefore, the power supply from the capacitor to the load can be stopped at that point. As a result, it is possible to suppress a decrease in the charged amount of the capacitor.

According to the third aspect, when the load can be operated autonomously by the power generated by the power generation unit, a part of the generated power can be supplied from the load to the processing unit of the power supply device, thereby suppressing the decrease in the charged amount of the capacitor.

According to the fourth aspect, when the load operates at the voltage higher than the output voltage of the capacitor, the size of the power supply device can be reduced by providing the booster circuit not in the power su device but in the electrical connection device.

DESCRIPTION OF EMBODIMENTS

Hereinafter, an embodiment of the invention will be described with reference to the drawings. The drawings are viewed in the direction of the reference signs.

Figure 1:
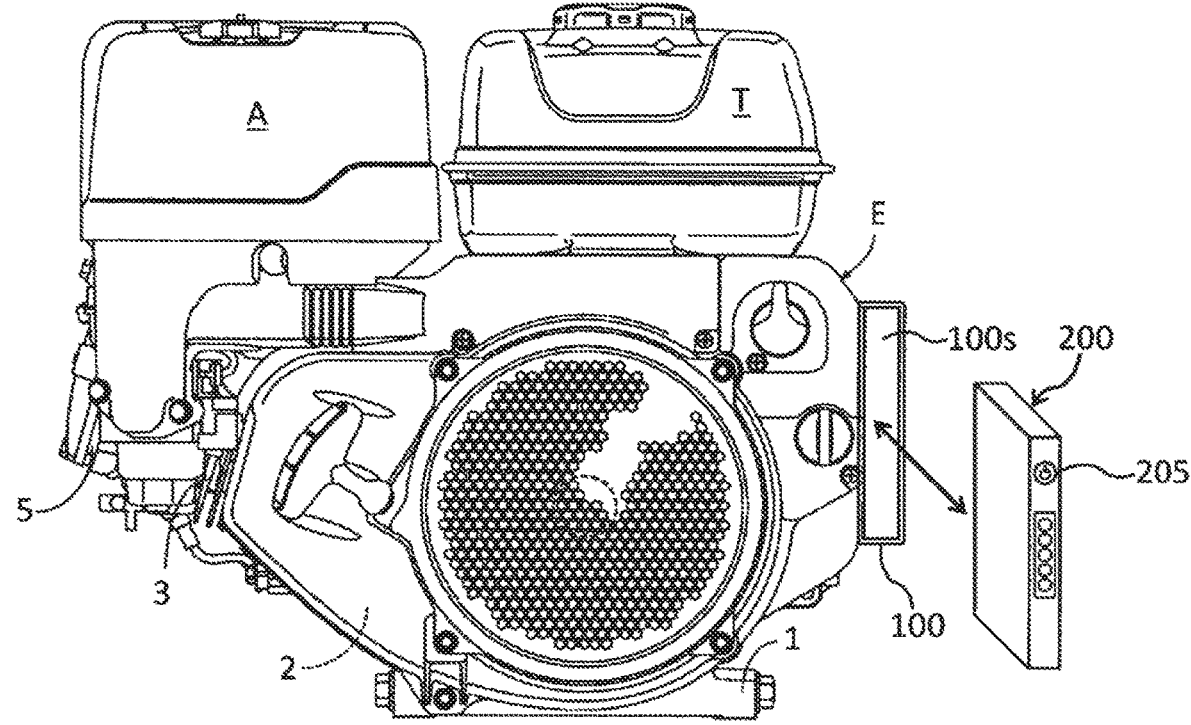
FIG. 1 is a diagram illustrating a relationship among a general-purpose engine, a receptacle, and a power supply device.

FIG. 1 is a diagram illustrating a relationship among a general-purpose engine, a receptacle, and a power supply device. As illustrated in FIG. 1, a power supply device 200 can be attached to and detached from a general-purpose engine E. The general-purpose engine E cannot be started up unless the power supply device 200 is attached to a receptacle 100 provided in the general-purpose engine E. The general-purpose engine E which can be operated by the power supply device 200 is associated with the power supply device 200 in advance. The general-purpose engine E is used as a power source for small industrial working machines for agriculture, construction, or the like.

As illustrated in FIG. 1, the general-purpose engine E includes a crankcase 2 having an installation flange 1 at the bottom, a cylinder block 3 extending obliquely from one side of the crankcase 2, and a cylinder head 5 joined to an end surface of the cylinder block 3 via a gasket. A fuel tank T is attached to the upper part of the crankcase 2 and an air cleaner A is attached to the upper part of the cylinder block 3. The installation flange 1 is installed in a work machine which uses the general-purpose engine E as a power source.

On the other side of the crankcase 2 of the general-purpose engine E, the receptacle 100 for attaching the power supply device 200 to the general-purpose engine E is provided integrally with the general-purpose engine E. A terminal which can be connected to a terminal provided on the back surface of the power supply device 200 is provided in the back of an accommodation space 100s of the receptacle 100. When the power supply device 200 is inserted into the accommodation space 100s of the receptacle 100 and the terminals are electrically connected to each other, the power supply device 200 becomes ready to start and power is supplied from the power supply device 200 to the general-purpose engine E, and further electrical signals can be transmitted between an Electric Control Unit (ECU) which controls the operation of the general-purpose engine E and a Central Processing Unit (CPU) of the power supply device 200. In this case, when a power switch 205 provided on the front of the power supply device 200 is turned on, the ECU of the general-purpose engine E communicates with the CPU of the power supply device 200, and then the general-purpose engine E becomes ready to start up.

Figure 2:
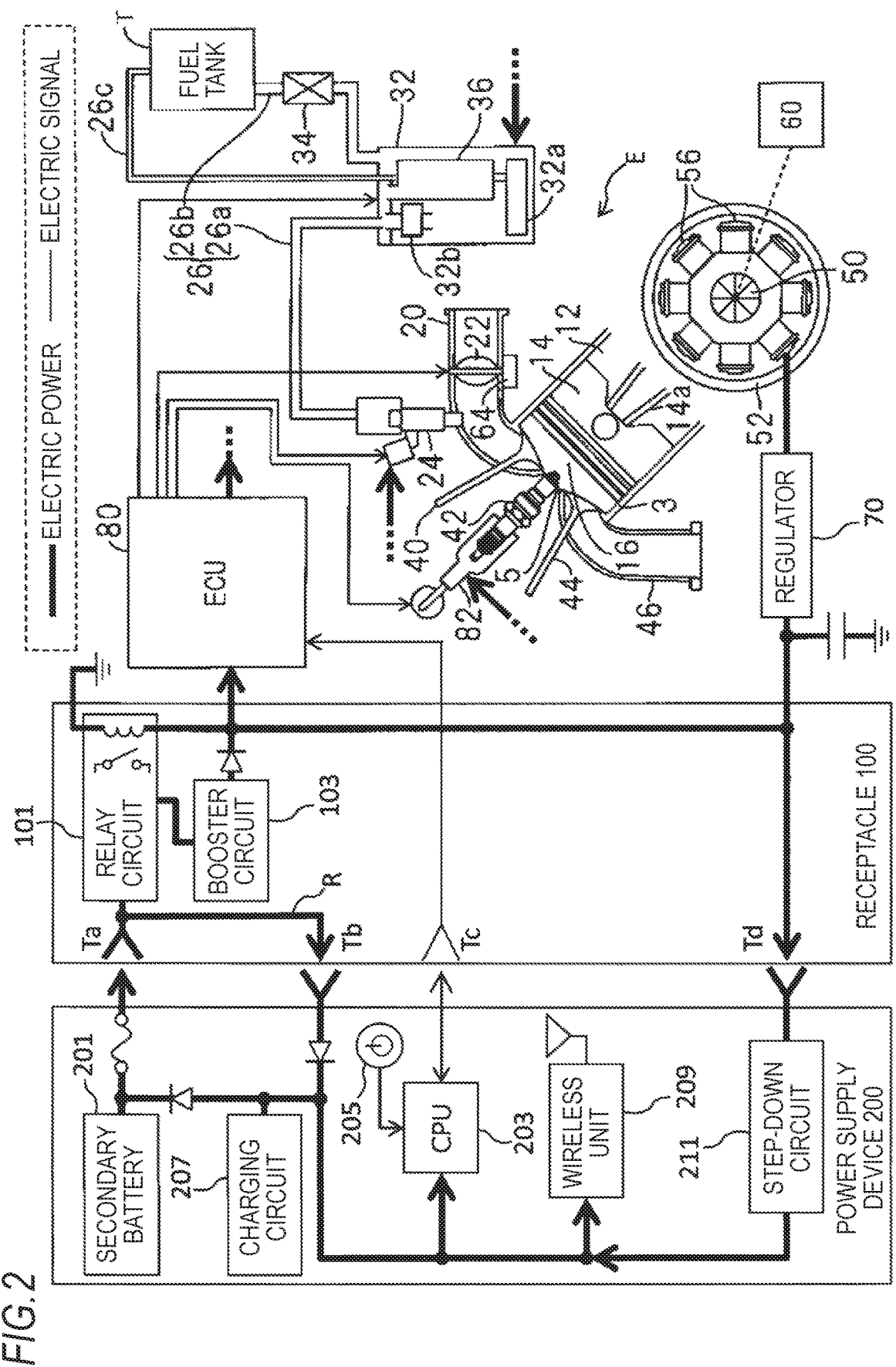
FIG. 2 is a diagram illustrating each internal configuration of the general-purpose engine, the receptacle, and the power supply device.

Hereinafter, with reference to FIG. 2, internal configurations of the general-purpose engine E, the receptacle 100, and the power supply device 200, and the relationship between them will be described.

[General-Purpose Engine E]

First, the internal configuration of the general-purpose engine E will be described. In a cylinder 12 formed inside the cylinder block 3 of the general-purpose engine 10, a piston 14 is accommodated so as to freely reciprocate. The cylinder head 5 is attached to the cylinder block 3 and a combustion chamber 16 is formed between the top of the piston 14 and the cylinder head 5. An intake pipe 20 is connected to the combustion chamber 16. A throttle valve 22 is disposed in the intake pipe 20 and an injector 24 is disposed in the vicinity of an intake port downstream thereof.

An electric motor (actuator, more specifically, a stepping motor) 64 is connected to the throttle valve 22. The electric motor 64 is configured to open and close the throttle valve 22 independently of the operation of an accelerator lever (not illustrated). That is, the throttle valve 22 is configured as a Drive By Wire type.

The injector 24 is connected to the fuel tank T via a fuel supply pipe 26. More specifically, the injector 24 is connected to a sub-fuel tank 32 via a first fuel supply pipe 26a and the sub-fuel tank 32 is connected to the fuel tank T via a second fuel supply pipe 26b. A low pressure pump 34 is inserted in the second fuel supply pipe 26b and the fuel (gasoline) stored in the fuel tank T is pumped up and pumped to the sub-fuel tank 32. A fuel pump (high pressure pump) 36 is disposed in the sub-fuel tank 32.

The fuel pump 36 pressurizes the fuel filtered by a filter 32a to a high pressure and pumps the fuel to the injector 24 through the first fuel supply pipe 26a while adjusting the pressure by a regulator 32b. A part of the fuel in the sub-fuel tank 32 is returned to the fuel tank T through a return pipe 26c.

The intake air drawn from the air cleaner A flows through the intake pipe 20, reaches the intake port in a state where the flow rate thereof is adjusted by the throttle valve 22, and mixes with the fuel injected from the injector 24 to form an air-fuel mixture. The air-fuel mixture flows into the combustion chamber 16 when an intake valve 40 is opened and burns when a spark plug 42 is ignited by an ignition coil 82 to drive the piston 14. The exhaust gas generated by the combustion flows through an exhaust pipe 46 and is released to the outside when an exhaust valve 44 is opened.

In the cylinder block 3, the crankcase 2 is attached to a side facing the cylinder head 5 and a crankshaft 50 is rotatably accommodated therein. The crankshaft 50 is connected to the piston 14 via a connecting rod 14a and rotates according to the driving of the piston 14.

A flywheel 52 is coaxially attached to one end of the crankshaft 50. A power generation coil 56 is attached to the inner position of the crankcase 2. The power generation coil 56 functions as an alternating current generator (ACG) which generates an electromotive force by crossing with the magnetic flux of a permanent magnet in association with the relative rotation with a plurality of permanent magnets (not illustrated) attached to the back side of the flywheel 52. The electromotive force generated in the power generation coil 56 is rectified by the regulator 70, thereby converted into an operating voltage (for example, 12 V) of the ECU 80.

The other end of the crankshaft 50 is connected to a working machine 60 that uses the general-purpose engine E as a power source.

Figure 3:
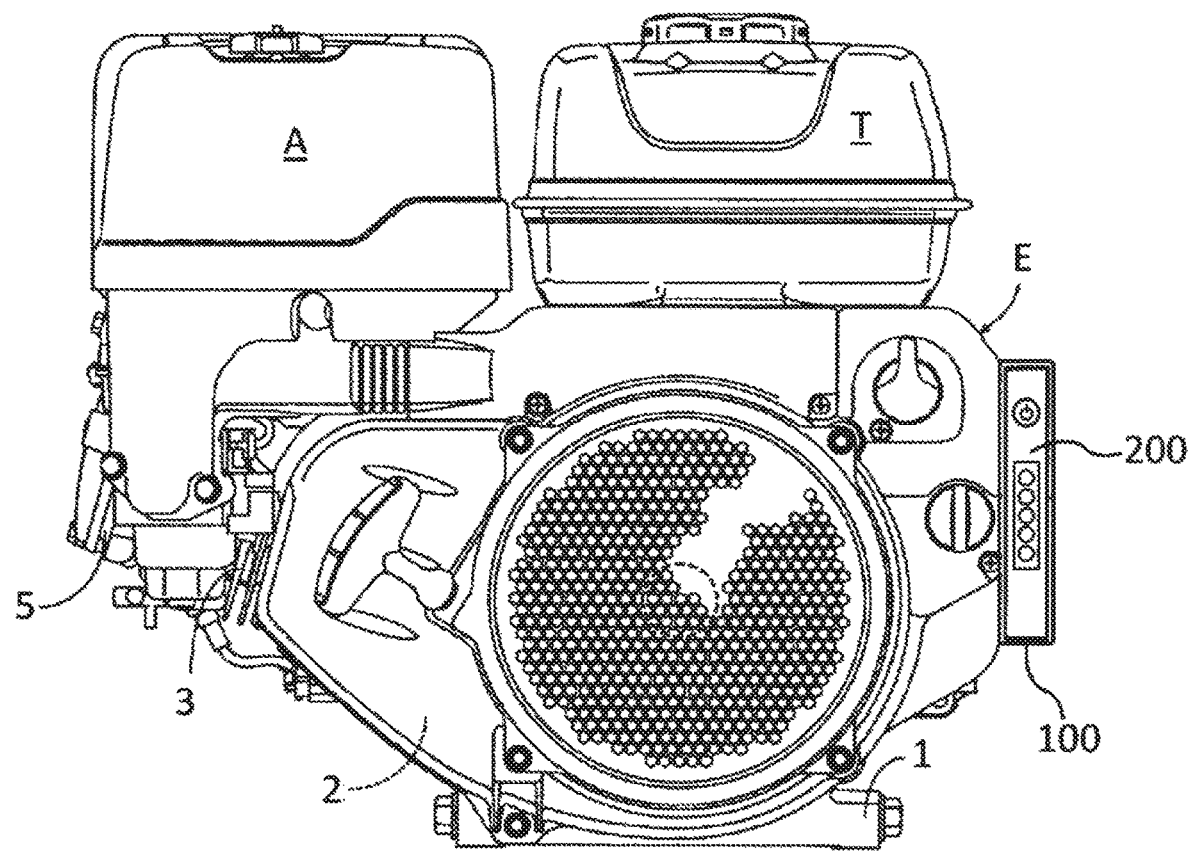
FIG. 3 is a diagram illustrating a state in which the power supply device is attached to the receptacle provided integrally with the general-purpose engine.

The operations of the fuel pump 36, the regulator 32b, the injector 24, the ignition coil 82, and the electric motor 64 described above are controlled by the ECU 80 of the general-purpose engine 10. In addition, the ECU 80 communicates with the CPU 203 of the power supply device 200 via the terminal of the receptacle 100. The power supply to the ECU 80 is performed from the power supply device 200 through the receptacle 100 until the power supply device 200 is attached to the receptacle 100 and the general-purpose engine E starts up and operates stably. Then, when the general-purpose engine E operates stably, the power supply to the ECU 80 is provided by power generation in the power generation coil 56. Similarly, the power supply to the fuel pump 36, the regulator 32b, the injector 24, and the spark plug 42 is also performed from the power supply device 200 via the receptacle 100 until the general-purpose engine E operates stably. Then, when the general-purpose engine E operates stably, the power supply is provided by power generation in the power generation coil 56. However, the power supply to the fuel pump 36, the regulator 32b, the injector 24, and the spark plug 42 is controlled by the ECU 80. In this way, when the general-purpose engine E is started up, power is supplied from the power supply device 200 to the above-described components which require a power source in a state where the power supply device 200 is attached to the receptacle 100 as illustrated in FIG. 3.

[Receptacle 100]

Next, the internal configuration of the receptacle 100 provided integrally with the general-purpose engine E will be described. The receptacle 100 includes four terminals Ta to Td, a relay circuit 101, and a booster circuit 103.

The terminal Ta is connected to one end of a switch contact included in the relay circuit 101. When the power supply device 200 is attached to the receptacle 100, the output voltage of the power supply device 200 is applied to the terminal Ta.

The terminal Tb is connected to the terminal Ta through a conduction path R inside the receptacle 100, and when the power supply device 200 is attached to the receptacle 100, the output voltage of the power supply device 200 applied to the terminal Ta is applied to the terminal Tb.

The terminal Tc is connected to the ECU 80 of the general-purpose engine E. When the power supply device 200 is attached to the receptacle 100, the terminal Tc is connected to the CPU 203 of the power supply device 200.

The terminal Td is connected to an output side of the regulator 70 of the general-purpose engine E. When the power supply device 200 is attached to the receptacle 100, the terminal Td is connected to an input side of a step-down circuit 211 of the power supply device 200.

The relay circuit 101 is a switch having a configuration in which one end of a switch terminal is connected to the terminal Ta and the other end is connected to an input side of the booster circuit 103. The output voltage of the regulator 70 of the general-purpose engine E is applied to a coil that opens or closes the switch by electromagnetic action. The switch of the relay circuit 101 is closed when the voltage applied to the coil is equal to or lower than a predetermined value and is opened when the voltage exceeds the predetermined value. The predetermined value is a rated output voltage set in the booster circuit 103.

The booster circuit 103 boosts the output voltage of the power supply device 200 applied via the relay circuit 101 to, for example, 12V. The output voltage of the booster circuit 103 is applied to the ECU 80.

In addition to the ECU 80, the output of the booster circuit 103 is connected to the coil of the relay circuit 101 and the output of the regulator 70 of the general-purpose engine E. Therefore, after the general-purpose engine E starts up, when the general-purpose engine E operates stably and the output of the regulator 70 exceeds the output voltage of the booster circuit 103, the switch of the relay circuit 101 is opened. Therefore, the power supply path from the power supply device 200 to the ECU 80 opens. In this case, the output voltage of the regulator 70 is applied to the ECU 80 of the general-purpose engine E.

[Power Supply Device 200]

Next, the internal configuration of the power supply device 200 will be described. The power supply device 200 includes a secondary battery 201, the CPU 203, the power switch 205, a charging circuit 207, a wireless unit 209, and the step-down circuit 211.

The secondary battery 201 is a chargeable/dischargeable lithium ion battery which outputs a voltage of about 5 V, for example. The output voltage of the secondary battery 201 is applied to the terminal Ta of the receptacle 100 when the power supply device 200 is attached to the receptacle 100.

The CPU 203 controls the operation of the power supply device 200 including communication with the ECU 80 of the general-purpose engine E, charging operation of the charging circuit 207, operation of the wireless unit 209, and the like. The electrical path from the secondary battery 201 to the CPU 203 is not conductive when the power supply device 200 is in a single state, that is, when power supply device 200 is not attached to the receptacle 100. However, when the power supply device 200 is attached to the receptacle 100, a conduction path R including the terminal Ta and the terminal Tb formed in the receptacle 100 is inserted between the secondary battery 201 and the CPU 203, and thus a power supply circuit from the secondary battery 201 to the CPU 203 via the receptacle 100 is established.

The power switch 205 is operated when the general-purpose engine E is started up or stopped. When the power switch 205 is turned on in a state where the power supply device 200 is attached to the receptacle 100, the CPU 203 communicates with the ECU 80 of the general-purpose engine E, and thus the general-purpose engine E is ready to start up.

The charging circuit 207 charges the secondary battery 201 having a reduced charging rate in a state where the power supply device 200 removed from the receptacle 100 is connected to an external power source via a cable or the like.

For example, the wireless unit 209 performs wireless communication with a portable information terminal owned by a user of the power supply device 200. Similarly to the CPU 203, the power supply from the secondary battery 201 to the wireless unit 209 is not performed when the power supply device 200 is in a single state, but is performed in a state where the power supply device 200 is attached to the receptacle 100.

The step-down circuit 211 reduces the output voltage of the regulator 70 applied via the terminal Td of the receptacle 100 to, for example, 5 V in a state where the power supply device 200 is attached to the receptacle 100. The voltage stepped down by the step-down circuit 211 is applied to the CPU 203 and the wireless unit 209.

As described above, according to the embodiment, when the power supply device 200 is attached to the receptacle 100, the power supply circuit from the secondary battery 201 of the power supply device 200 to the CPU 203 is established via the receptacle 100. However, when the power supply device 200 is in a single state not attached to the receptacle 100, the electric path from the secondary battery 201 to the CPU 203 is not conductive. Therefore, it is possible to suppress a decrease in the charged amount of the secondary battery 201 due to the generation of dark current.

Also, when the output voltage of the regulator 70 of the general-purpose engine E exceeds the voltage (the output voltage of the booster circuit 103) applied from the power supply device 200 to the general-purpose engine E and the general-purpose engine E can operate autonomously with the power generated by the power generation coil 56, the switch of the relay circuit 101 is opened to open a power supply path from the secondary battery 201 to the general-purpose engine E Since the power supply from the secondary battery 201 can be stopped when the switch of the relay circuit 101 is opened, a decrease in the charged amount of the secondary battery 201 can be suppressed.

Also, when the general-purpose engine E becomes autonomously operable by the power generated by the power generation coil 56, by supplying a part of the generated power from the general-purpose engine E to the CPU 203 and the wireless unit 209 of the power supply device 200, it is possible to suppress a decrease in the charged amount of the secondary battery 201.

Furthermore, since the booster circuit 103 is provided in the receptacle 100 instead of the power supply device 200, the power supply device 200 can be reduced in size.

The invention is not limited to the embodiment described above and can be appropriately modified and improved.

REFERENCE SIGNS LIST

E general-purpose engine
1 flange
2 crankcase
3 cylinder block
5 cylinder head
T fuel tank
A air cleaner
12 cylinder
14 piston
14a connecting rod
16 combustion chamber
20 intake pipe
22 throttle valve
24 injector
26 fuel supply pipe
26a first fuel supply pipe
26b second fuel supply pipe
26c return pipe
32 sub-fuel tank
32a filter
32b regulator
34 low pressure pump
36 fuel pump
40 intake valve
42 spark plug
44 exhaust valve
46 exhaust pipe
50 crankshaft
52 flywheel
56 power generation coil
60 working machine
70 regulator
64 electric motor
80 ECU
82 ignition coil
100 receptacle
100s accommodation space
Ta to Td terminals
101 relay circuit
103 booster circuit
200 power supply device
201 secondary battery
203 CPU
205 power switch
207 charging circuit
209 wireless unit
211 step-down circuit

The invention claimed is:

1. A load operating device which includes a power supply device which is detachable from a load and can supply power to the load in a state of being attached to the load and an electrical connection device which is provided integrally with the load and electrically connects the power supply device and the load in a state where the power supply device is attached to the load, wherein the power supply device includes
a capacitor which stores power to be supplied to the load, and
a processing unit in which an electric path from the capacitor to the processing unit is not conductive in a state where the power supply device is not electrically connected to the electrical connection device, a power supply circuit from the capacitor to the processing unit via the electrical connection device is established in a state where the power supply device is electrically connected to the electrical connection device, the load includes an internal combustion engine having an electronically controlled fuel injection device and a power generation unit which generates power by operation of the internal combustion engine, the electrical connection device includes a relay circuit which opens or closes a power supply path from the capacitor of the power supply device attached to the load, to the load, the relay circuit opens the power supply path when an output voltage of the power generation unit exceeds a voltage applied from the power supply device to the load, and the power supply circuit from the capacitor to the processing unit via the electrical connection device is established when a conduction path, formed in the electrical connection device, is inserted between the capacitor and the processing unit by electrically connecting the power supply device to the electrical connection device.

2. The load operating device according to claim 1, wherein the processing unit of the power supply device is supplied with power from the load via the electrical connection device when the output voltage of the power generation unit exceeds the voltage applied from the power supply device to the load.

3. The load operating device according to claim 2, wherein the load operates at a voltage higher than an output voltage of the capacitor, and the electrical connection device includes a booster circuit for boosting the output voltage of the capacitor.

4. The load operating device according to claim 1, wherein the load operates at a voltage higher than an output voltage of the capacitor, and the electrical connection device includes a booster circuit for boosting the output voltage of the capacitor.

\* \* \* \* \*